Figure 1:
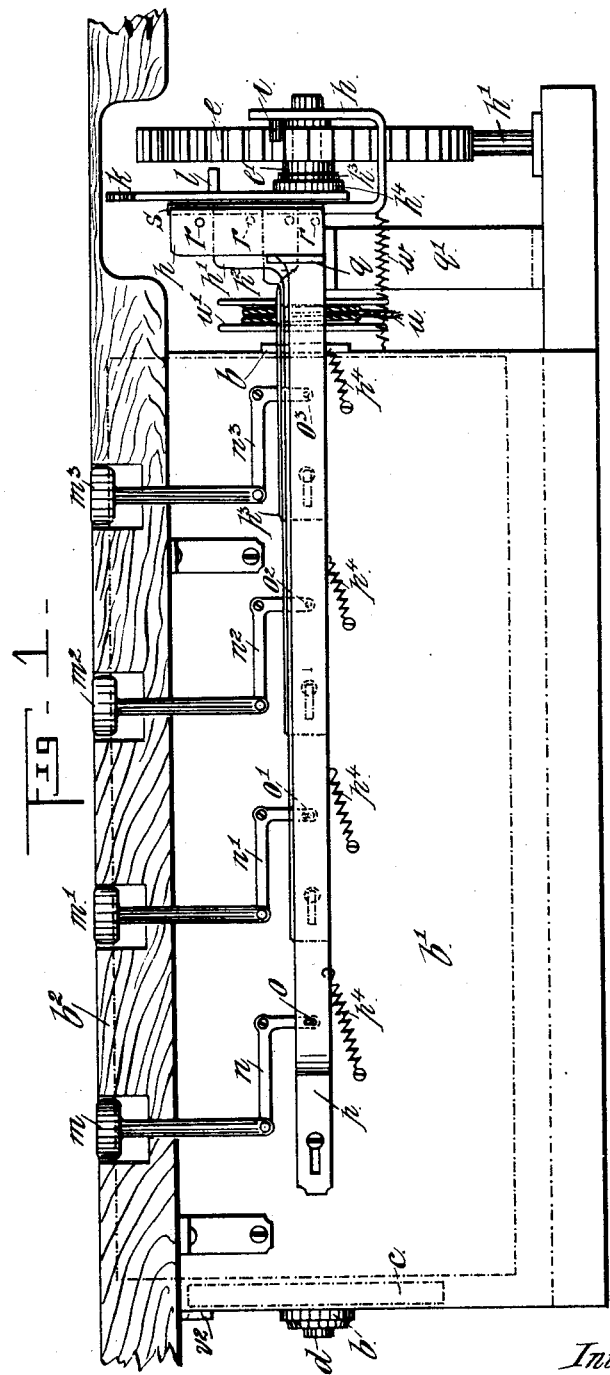

(No Model.)  3 Sheets—Sheet 1.

A. SMITH.
COMBINED MEASURING AND COST INDICATING APPARATUS.

No. 589,310.  Patented Aug. 31, 1897.

Witnesses:
Henri H. Rayward.
W. H. Cuming

Inventor:
Alfred Smith.

THE NORRIS PETERS CO., PHOTO-LITHO., WASHINGTON, D. C.

(No Model.) 3 Sheets—Sheet 2.
A. SMITH.
COMBINED MEASURING AND COST INDICATING APPARATUS.
No. 589,310. Patented Aug. 31, 1897.
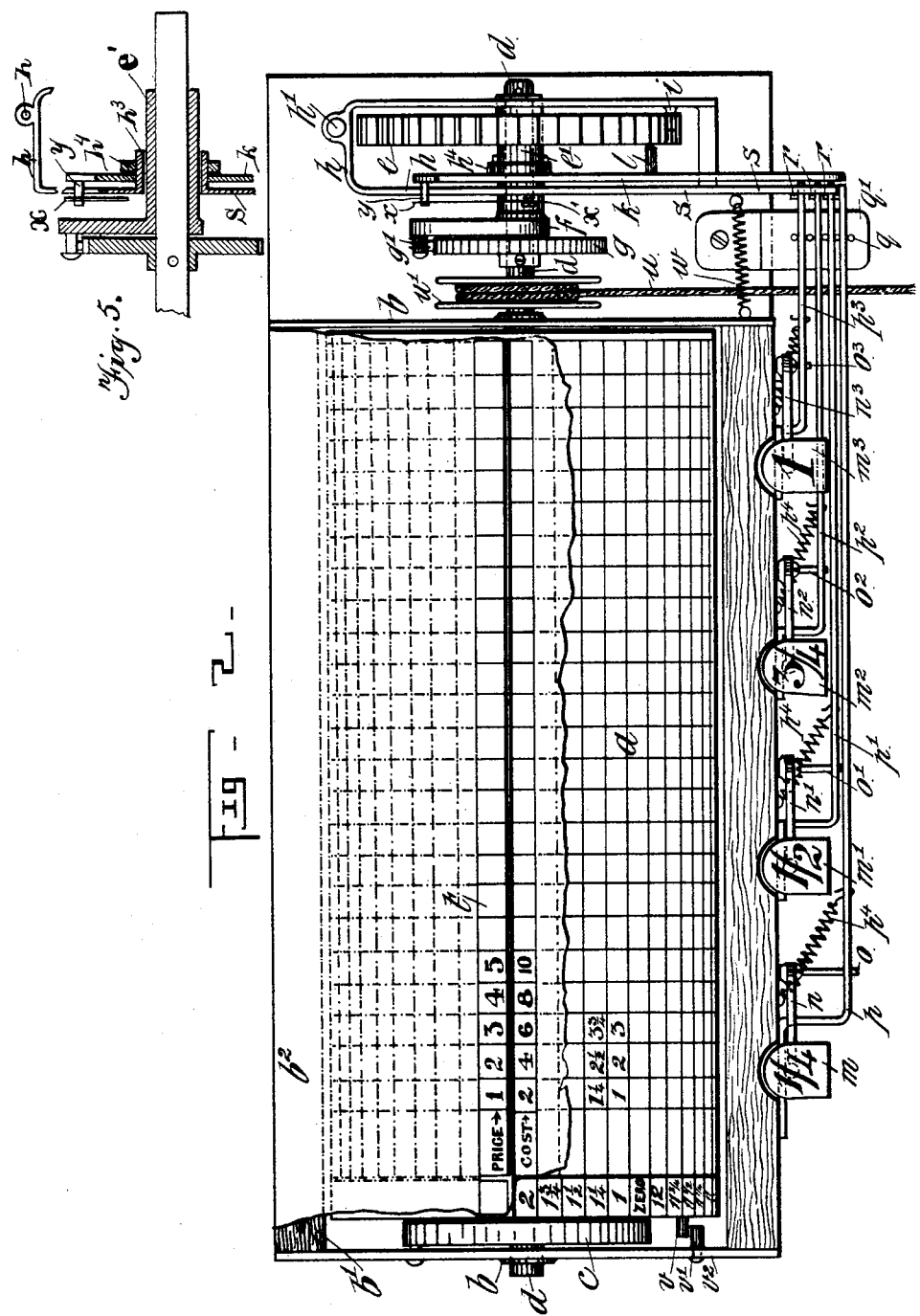

(No Model.) 3 Sheets—Sheet 3.
A. SMITH.
COMBINED MEASURING AND COST INDICATING APPARATUS.
No. 589,310. Patented Aug. 31, 1897.
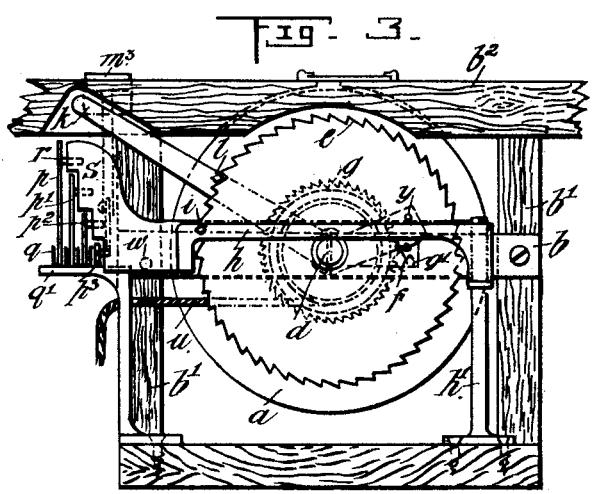
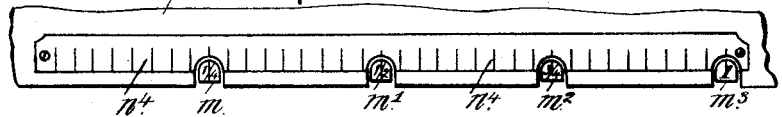
Witnesses.
Inventor: Alfred Smith

United States Patent Office.

ALFRED SMITH, OF CHRISTCHURCH, NEW ZEALAND.

COMBINED MEASURING AND COST-INDICATING APPARATUS.

SPECIFICATION forming part of Letters Patent No. 589,310, dated August 31, 1897.

Application filed April 17, 1897. Serial No. 632,681. (No model.)

*To all whom it may concern:*

Be it known that I, ALFRED SMITH, electrician, a subject of the Queen of Great Britain, residing at 71 Cathedral Square, Christchurch, in the provincial district of Canterbury, in the Colony of New Zealand, have invented a new and Improved Combined Measure and Cost-Indicating Machine, of which the following is a specification.

This invention relates to the class of calculating-machines used for indicating the cost of goods sold by lineal measurement.

In certain machines for the purpose with which I am acquainted a roller is employed which bears the cost-markings, and is caused to revolve by a pawl or pawls engaging in a ratchet-wheel upon its axle, the pawls being actuated by tappets placed at intervals along a measuring-staff. This method has been found unsatisfactory, as it may happen in practice that a tappet is not depressed sufficiently far to cause the roller to revolve through the required space to bring the correct column of cost-markings into indicating position.

In my invention a roller is mounted horizontally in bearings beneath a counter, and the essential feature is that it normally tends to revolve under influence of a spring or other equivalent motor, the roller being alternately retained and released by escapement-gearing, whereby it is insured that if it is released at all it must revolve through the desired space and be retained in that position until again operated.

The periphery of the roller is marked with longitudinal and circumferential lines, whereby divisions are formed, each of which bears the cost of an article of a certain length and price.

The cost-markings are so arranged that the figures form circumferential and longitudinal columns, and the counter beneath which the roller is mounted has a slot through which one longitudinal column is visible at a time.

Each circumferential column bears the cost of articles of different length at one price and each longitudinal column the cost of articles of one length at different prices.

The longitudinal columns are marked at one or both ends with the length to which the cost figures therein refer and a scale fixed above and, if desired, also below. The slot through which a column is visible is divided to correspond with the circumferential columns and bears figures to indicate the price to which each of said columns is devoted.

The escapement-gearing referred to may be operated by depressing any one of a number of tappets or push-buttons arranged at intervals along an ordinary flat metal measuring-staff fixed upon the counter.

The tappets are placed and the mechanism proportioned so that a salesman when measuring against the measuring-staff in the ordinary way finds his hands in juxtaposition to the tappet, which will, when depressed, actuate the escapement-gearing and permit the roller to revolve through a space necessary to bring the longitudinal column of figures into view, giving the length of material he has measured off and the cost thereof at different prices.

I will now more particularly describe my invention by the aid of the accompanying drawings, wherein—

Figure 1 is a side elevation, Fig. 2, a plan, and Fig. 3 an end elevation, of a machine according thereto. Fig. 4 is a part plan showing the arrangement of tappets along the measuring-staff. This view is drawn more in proportion than the preceding figures, which for the sake of clearness have been reduced disproportionately. Fig. 5 is a detail sectional view of part of the mechanism at the right-hand end of Fig. 2.

Similar letters of reference indicate the same parts in all the figures.

The roller $a$, preferably formed of sheet metal, is journaled in bearings $b$, carried upon brackets $b'$, fixed beneath the counter $b^2$, and normally tends to revolve under the influence of a coil-spring $c$ upon its axle $d$.

A ratchet-wheel $e$ is fixed upon a sleeve $e'$, journaled upon the axle $d$, and the arm $f$, fixed to the sleeve, carries a spring-pawl $g'$, which gears in one direction with a ratchet-wheel $g$, fixed upon the axle.

A loop or bridle $h$ is mounted upon a vertical pivot $h'$, one arm of the loop carrying a pawl-pin $i$, which gears in the ratchet-wheel $e$. The other arm $s$ of the loop has a boss $h^3$, which is fitted loosely upon the sleeve $e'$, and a lever $k$, journaled upon the boss $h^3$ and kept in position thereon by a collar $h^4$, carries a pawl-pin $l$, engaging the ratchet-wheel $e$, when the loop is vibrated upon its pivot in a manner to be described.

Tappets $m$, $m'$, $m^2$, and $m^3$, placed at the quarter, half, three-quarters, and one yard divisions of a measuring-staff $n^4$, fixed upon the counter, (shown in Fig. 4,) have stems which are severally pivoted to bell-crank levers $n$, $n'$, $n^2$, and $n^3$.

The respective bell-crank levers have each a pin $o$ $o'$ $o^2$ $o^3$, operating one of the four slide-bars $p$ $p'$ $p^2$ $p^3$ by engaging in a slot formed therein.

Pins $q$ in the bracket $q'$ form guides for the slide-bars, each of which has a pin or projection $r$, which, when the bar is moved laterally by depression of its tappet, comes in contact with the end of the arm $s$ of the loop $h$ and causes the loop to turn upon its pivot and the pawl-pin $l$ to come out of as the pawl-pin $t$ upon the lever $k$ passes into engagement with the ratchet-wheel $e$.

The lever $k$, being pivoted, moves with the ratchet-wheel $e$ as the latter turns under influence of the spring $c$.

The vibration of the lever $k$, and consequently the revolution of the ratchet-wheel $e$, is limited by the end of the lever coming in contact with the end of any one of the slide-bars referred to which has been operated, the end of the bar passing through or alongside the arm $s$ into the path of the end of the lever. The ends of the respective slide-bars are proportioned to permit the lever to vibrate, and consequently the roller to revolve, through more or less space, according to the position the tappet operating the slide-bar occupies upon the measuring-staff.

A spring $w$ causes the loop to return to its normal position when the tappet is released, the pawl-pin $i$ passing back into engagement with and retaining the ratchet-wheel and the lever $k$ being returned for a fresh operation by a spring $x$, a stop-pin $y$ upon one end of the lever coming into contact with the loop $h$ and stopping it in its proper position. This spring $x$ is simply a piece of spring-wire bearing on top of the pin $y$ at one end and held at its other end by a pin $x'$, projecting from the side of the loop $h$, as shown in Fig. 2.

The depression of the tappet $m$ allows the roller to revolve through the space of one longitudinal column of figures, and a similar operation of tappets $m'$, $m^2$, and $m^3$ permits the roller to revolve through two, three, and four columns, respectively.

A scale $t$, fixed upon the counter in line with the slot therein and divided to correspond with the circumferential columns upon the roller, bears figures which refer to such columns and indicate the price per yard to which they are respectively devoted.

One longitudinal column upon the roller is left blank to serve as a starting-point, and the roller is returned after each measuring operation by a cord $u$, coiled around a sheave $u'$, fixed to the drum-axle $d$, the ratchet-wheel $g$ and pawl $g'$ permitting the drum to revolve back independently of the wheel $e$. A pin $v$ in the end of the roller engages with the stud $v'$ upon a fixed bracket $v^2$ and stops the roller when revolved back at starting-point and also just before it completes a forward revolution.

Each of the slide-bars has a spring $p^4$, which returns it and the bell-crank lever operating it to their normal positions.

As an illustration of the operation of the machine, and supposing the roller to be arranged to give the cost at quarter-yard intervals, when a salesman is required to measure off one yard and a quarter of material he will first measure one yard in the ordinary way, and as his hand in pulling out the material reaches the end of the measuring-staff it will come over the tappet $m^3$, which he will depress, and the roller will revolve through the space of four longitudinal columns. He will then measure the remaining quarter-yard and depress the tappet $m$, when the roller will revolve through the space of one column and expose to view through the slot in the counter the longitudinal column of figures, giving the cost of one yard and a quarter at different prices. By a glance at the scale $t$ he will find the division bearing the price per yard of the material dealt with and upon the roller immediately below it the cost of a yard and a quarter at that price. The circumferential column at the end of the roller will also give the length of material measured off.

Having now particularly described my invention and in what manner the same is to be performed, I declare that what I claim is—

1. In a machine for indicating the cost of goods sold by lineal measurement a spring-driven roller having cost-markings in longitudinal and circumferential columns upon its periphery, such roller being controlled by ratchet-and-escapement gearing operated by tappets placed at intervals upon a measuring-staff whereby one or other of the longitudinal columns of figures is brought into position in relation to a fixed indicating-scale substantially as specified herein and illustrated.

2. A roller having cost-markings in longitudinal and circumferential columns upon its periphery; an indicating-scale fixed above it denoting the prices to which the circumferential columns are devoted; a spring for revolving the roller, and a ratchet-wheel upon the roller-axle, controlled by an escapement, whereby one or other of the longitudinal columns is brought into indicating position, slide-bars for operating and differentiating the action of the escapement and tappets fixed upon bell-crank levers for operating the slide-bars substantially as and for the purposes herein described and illustrated.

3. The spring-driven roller $a$ the ratchet escapement-wheel $e$ journaled upon the roller-axle and revolving with it in one direction, the pivoted loop $h$ and the spring $w$ the pawl-pin $i$ normally engaging the wheel $e$ the lever $k$ upon the boss $h^3$ having a pawl-pin $l$ engaging wheel $e$ when the loop is vibrated, the spring $x$ operating upon lever $k$ and the stop-pin $y$ the whole substantially as herein described and illustrated.

4. The spring-driven roller $a$, the ratchet-wheel $e$ fixed upon a sleeve journaled upon the roller-axle, an arm $f$ upon the sleeve having a pawl $g'$ engaging with a ratchet-wheel $g$ fixed upon the axle, the sheave $u'$ and the cord $u$ coiled around it for returning the roller to starting-point substantially as specified and illustrated.

Dated this 1st day of March, 1897.

ALFRED SMITH.

Witnesses:
W. B. CUMING,
HENRIE H. RAYWARD.